J. R. SNYDER.
AIR BRAKE SYSTEM.
APPLICATION FILED JULY 25, 1912.

1,102,099.

Patented June 30, 1914.
4 SHEETS—SHEET 4.

WITNESSES

INVENTOR

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

AIR-BRAKE SYSTEM.

1,102,099.   Specification of Letters Patent.   Patented June 30, 1914.

Application filed July 25, 1912. Serial No. 711,433.

*To all whom it may concern:*

Be it known that I, JACOB RUSH SNYDER, a resident of Pittsburgh, in the county of Allegheny and State of Pennsylvania, have invented a new and useful Improvement in Air-Brake Systems, of which the following is a specification.

This invention relates to air brake systems for railway trains.

The purposes of the invention are to provide a better control of the brakes of the train as a whole and of the engine and train brakes independently than as heretofore, to apply the engine brakes and cut off the steam supply to the engine cylinders automatically upon bursting of a hose or other break in the train line, to cut off the steam supply to the engine cylinders either from the engineer's valve, the triple valve or a special valve for that purpose operating automatically when the train line bursts from any cause, or upon emergency application of the brakes, to provide for the graduated release of the brakes, to maintain the pressure in the train pipe against leakage from any cause when the engineer's brake valve is in service lap position, to secure and maintain a uniform pressure in the locomotive brake cylinders regardless of piston travel or leakage, and to provide a system which is well adapted for double heading, as well as possessing other advantages which will hereinafter more fully appear.

The invention comprises the arrangement of parts and the special valves hereinafter described and claimed.

In the accompanying drawings Figures 1, 1$^A$ and 1$^B$ show the system diagrammatically.

Figure 1:
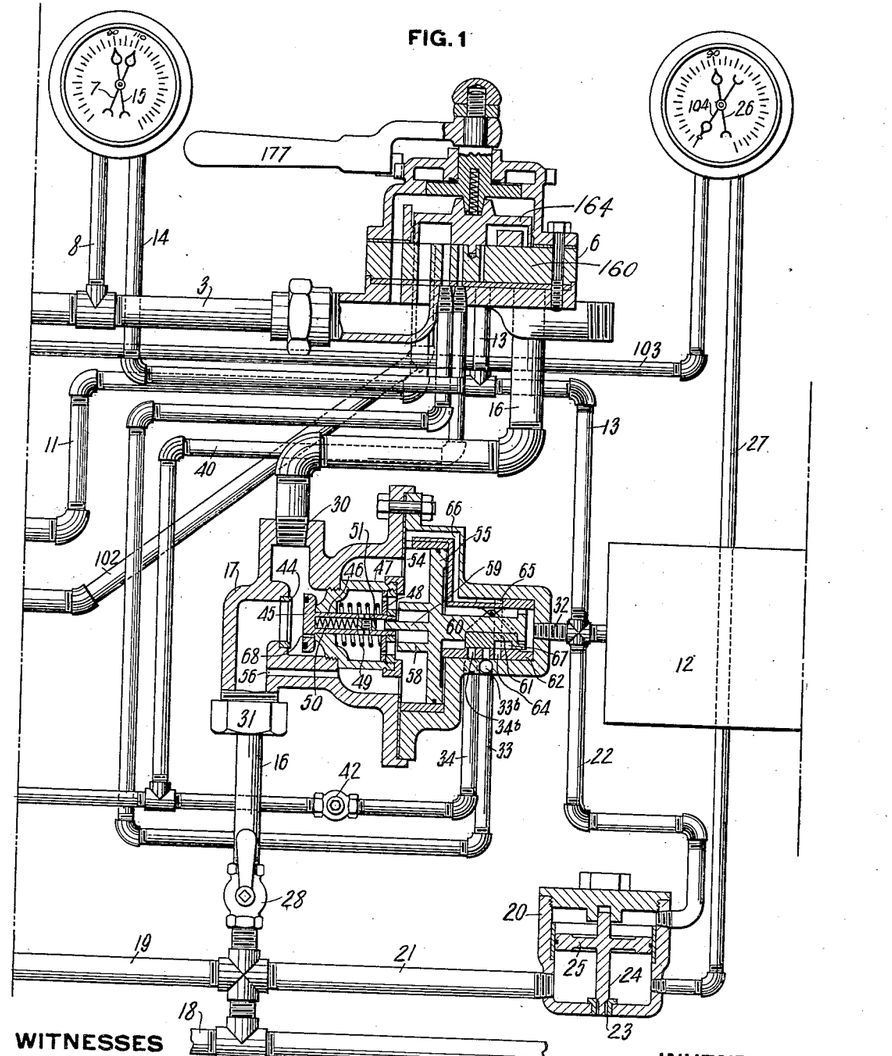
Figures 2, 4, 6:
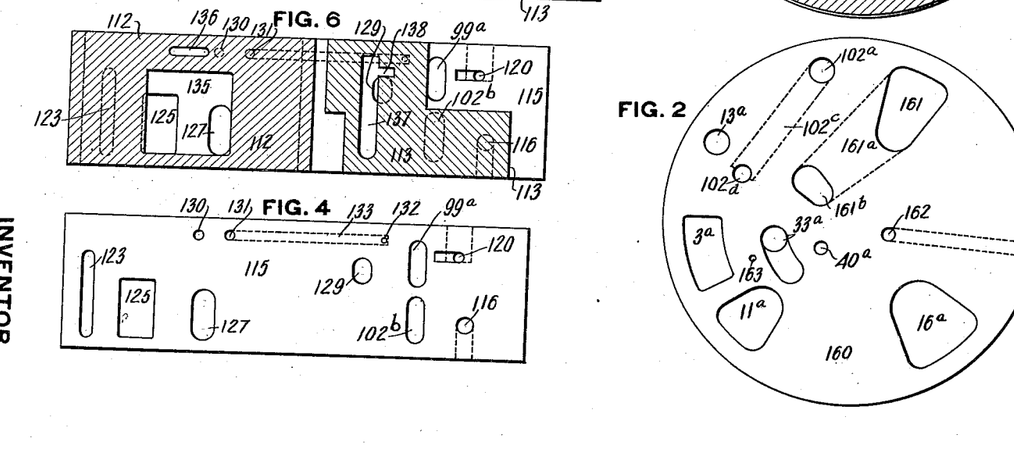
Fig. 2 is a plan view of the valve seat of the engineer's brake valve.
Fig. 4 is a plan view of the engine triple valve seat.
Figs. 5, 6 and 7 are diagrammatic views of the engine triple valve in different positions, Fig. 5 showing the same in full release position, Fig. 6 in full service position, and Fig. 7 in emergency position.

In the drawings, 1 indicates an air pump or other suitable compressor and 2 the main reservoir supplied thereby and from which a pipe 3 provided with a strainer 4 and cutout cock 5 leads to the engineer's brake valve 6, being connected to the port 3$^a$, Fig. 2. A gage 7 is connected at 8 to main reservoir pipe 3. A branch 9 from the main reservoir pipe 3 connects through feed valve 10 with a pipe 11 leading to the port 11$^a$ in the seat of the engineer's brake valve.

12 is the usual equalizing reservoir having a pipe connection 13 to the port 13$^a$ in the seat of the engineer's brake valve, and also having a connection 14 to the gage 15.

16 is the train pipe connection to the port 16$^a$ in the seat of the engineer's valve and connecting through an intermediate valve 17, hereinafter described, with the train line 18 which runs for the full length of the train and with an engine brake pipe 19.

20 illustrates an ordinary equalizing valve having a connection 21 to the train pipe, a connection 22 to the equalizing reservoir 12, and a vent port 23 to the atmosphere. This port is controlled by valve 24 actuated by piston 25 in the valve casing and subject on its upper face to equalizing reservoir pressure through connection 22 and on its lower face to train pipe pressure through connection 21. This valve operates in the usual manner of equalizing valves, that is to say, for service application the pressure in equalizing reservoir 12 is reduced to the proper degree and the engineer's brake valve then put in lap position. This causes valve 24 to open and permits the train pipe to vent to the atmosphere until it equalizes with the retained pressure in the equalizing reservoir. Train pipe pressure is indicated by a gage 26 having a connection 27 to the train pipe side of the equalizing valve chamber. In the train pipe connection 16 between the special valve 17 and the brake pipes 18 and 19 is a cut-out cock 28 which will be closed when the engine is running second or subsequent in a multiple header, but open when the engine is leading.

The valve 17 serves to maintain the train pipe pressure against losses from leakage, allows for a graduated release of the brakes, serves as a means for cutting off the steam supply to the engine cylinders, and closes communication between the main reservoir and the train pipe in case the train pipe bursts from any cause so as to conserve the main reservoir pressure when the engineer's valve is in running position and also prevent the engine from tearing from the train.

This valve is specifically illustrated, described and claimed in my application filed June 24, 1912, Serial No. 705,566. It comprises a suitable casing having a connection at 30 to the engineer's brake valve, a connection at 31 to the train pipe, a connection 32 to the equalizing reservoir, a connection 33 leading to a port 33ª in the seat of the engineer's brake valve, and a connection 34 leading to a small cylinder 35 in which is a piston 36 normally restrained by spring 37 and having an operative connection to a steam cut-off valve 38, that is, a valve so arranged that when the piston 36 is actuated it serves to cut-off the supply of steam to the locomotive cylinders. A branch pipe 40 leads from pipe 34 to a port 40ª in the seat of the engineer's brake valve. In the pipe 34 between the steam cut-off valve and branch 40 is a three-way cock 41, and in said pipe on the opposite side of branch 40 is a non-return check valve 42 which allows air to flow away from the special valve but not toward the same.

Between the engineer's brake valve connection 30 and train pipe connection 31 is a seat 44 for the emergency cut-off valve 45, the latter seating toward the train pipe and when on its seat closing communication between the main reservoir and the train pipe. Valve 45 is provided with a hollow stem 46 guided in a cage 47 and having its free end passing through follower plate 48 slidable in the cage 47 and on said stem, and held on said stem by a nut on the extreme end of the stem. A strong spiral spring 49 is interposed between the bottom of the cage and the follower 48 and normally holds the valve 45 open. A lighter spring 50 is in the hollow stem 46 and interposed between the bottom of the stem and a follower block 51 therein, which follower block has a certain amount of idle movement in said stem. In the casing is a suitable piston chamber 54 in which works a piston 55 subject on one side to train pipe pressure through port 56 and on its opposite face to equalizing reservoir pressure through connection 32. The piston 55 is provided on one face with an annular projection 58 arranged when the piston is moved to the left to contact with follower 48, and with a stem 59 located centrally of the annular projection 58 and extending into the hollow stem of valve 45 and arranged to contact with the follower block 51. The opposite face of piston 55 is provided with a stem 60 operatively connected with a slide valve 61 which works on a seat 62 provided with three ports, to-wit: a port 34ᵇ communicating with the steam cut-off valve connection 34, a port 33ᵇ communicating with the pipe 33 through which main reservoir pressure coming by way of the reducing valve 10 and engineer's brake valve 6 is admitted underneath the slide valve 61 when the engineer's brake valve is in running or lap position, and a port 64 communicating with an annular passage 65 having communication through passage 66 with the piston chamber 54 on the train pipe side of piston 55 so that port 64 may be termed a train pipe port. The slide valve 61 is provided with a suitable cavity 67 which is so arranged that in one position it establishes communication between the main reservoir port 33ᵇ and the train pipe port 64, and in another position establishes communication between the main reservoir port 33ᵇ and the steam cut-off valve port 34ᵇ.

The normal position of the valve is shown in Fig. 1 with the piston 55 to the right, holding slide valve 61 in such position as to blank all of the ports in the valve seat and with the spring 49 holding cut-off valve 45 open. The piston 55 is subject to equal pressure on both faces, train pipe pressure on one side and equalizing reservoir pressure on the other side so that it remains in the position shown irrespective of whether the system is in running or application position. Should the pressure in the train pipe fall, due to leakage or other cause which does not produce an abnormally large drop in pressure, the preponderance of equalizing reservoir pressure then moves the piston 55 to the left until its projection 58 contacts with the follower plate 48 when the spring 49 arrests further movement in that direction. This brings slide valve 61 to such position that its cavity 67 connects main reservoir port 33ᵇ with train pipe port 64 so that main reservoir air can flow to the train pipe and automatically replenish the pressure therein. As soon as train pipe pressure is slightly in excess of equalizing reservoir pressure, the piston 55 moves in the opposite direction, thereby breaking this communication. Should the train pipe again leak, this operation is repeated, so that the valve automatically maintains train pipe pressure against leakage. Should a hose burst or other sudden rupture or opening of the train line occur, the excessive drop of pressure on the train pipe side of piston 55 allows said piston to move fully over to the left, compressing spring 49 and closing cut-off valve 45 so as to interrupt communication from the engineer's brake valve to the train pipe and prevent depletion of main reservoir pressure which would otherwise occur when the engineer's brake valve is in running position, making it unnecessary for the engineer to move his valve to lap position to conserve main reservoir pressure but leaving him free to perform such other operations as are necessary whenever a hose bursts or in like emergency. At the same time the slide valve 61 connects main reservoir port 33ᵇ with steam cut-off valve port 34ᵇ, thereby permitting main reservoir pressure to flow to the steam cut-off valve cylinder 35 to actuate valve 38 and cut-off the supply of steam to the engine cylinders. As a consequence, danger of tearing the engine from the remainder of the train whenever a hose bursts is largely avoided and the waste of main reservoir air is prevented. The emergency valve 45, however, does not prevent the application of the brakes in the usual emergency application for the reason that in such applications the equalizing reservoir is simultaneously exhausted with the train pipe, so that the pressures on two sides of the piston 55 remain equal and the valve does not act. Even if it should act, it will not interfere with the proper emergency application of the brakes because the train pipe pressure then rushing to the engineer's valve will open valve 45 against the relatively light spring 50 and permit the train pipe to be exhausted to the necessary degree. Valve 45 is provided with an equalizing port 68 for the purpose of enabling the piston 55 to be moved to its right hand position after an actuation through the bursting of a hose. After such actuation cut-out cock 28 is momentarily closed and main reservoir pressure will leak through port 68 until the pressures on opposite sides of valve 45 balance, thus permitting spring 49 to move the piston 55 to the right. The piston 55 and slide valve 61 also serve for graduating off the brakes, which is done by the engineer increasing the pressure in the equalizing reservoir to a degree proportional to the desired reduction in the brake cylinder pressure. This moves piston 55 to the left until arrested by projection 58 contacting with follower plate 48 so that the cavity 67 in slide valve 61 establishes communication between the main reservoir port 33ᵇ and train pipe port 64 and permits the train pipe pressure to be increased until equal to the equalizing reservoir pressure for graduating off the brakes to a corresponding extent, as will be readily understood. This provides a very accurate and simple means for graduating off the brakes, as the engineer need merely watch his equalizing reservoir gage and admit air to the equalizing reservoir until the gage shows an increase proportional to the amount of desired brake cylinder reduction.

The feed valve 10 illustrated is of the construction described and claimed in my application Serial No. 705,565, filed June 24, 1912. It comprises a suitable casing in which is a movable abutment, to-wit; a diaphragm 70, which divides the casing into two chambers, to-wit; chamber 71 and 72. The chamber 71 has a connection 9ᵃ to the main reservoir pipe 3 and a connection 11ᵃ to the pipe 11 leading to the engineer's brake valve. Between these two connections in chamber 71 is a suitable wall or partition 73 provided with a port 74 for establishing communication between the main reservoir pipe 3 and the pipe 11. This port is controlled by slide valve 75 actuated by a projection 76 on stem 77 of diaphragm 70. The chamber 72 has a connection 78 to the main reservoir branch pipe 9, said connection 78 being controlled by an ordinary three-way cock 79. A gage 80 is connected to chamber 72 to indicate the pressure therein. The diaphragm 70 is subject on one side to train pipe pressure in chamber 71 and on its opposite side to a predetermined fixed pressure in the closed chamber 72 which is admitted thereto by opening cock 79 until gage 80 indicates the desired train pipe pressure. Whenever train pipe pressure falls below this point, the diaphragm 70 is moved by the trapped pressure in chamber 72 to the left, carrying with it the slide valve 75 and opening communication between the main reservoir connection 9ᵃ and train pipe connection 11ᵃ so as to replenish the train pipe pressure. As soon as train pipe pressure in chamber 71 equalizes with the predetermined fixed pressure in chamber 72, or very slightly exceeds the same, the diaphragm 70 moves to the right, carrying with it the valve 75 and cuts off further communication between the main reservoir and the train pipe. Consequently, the pressure in the train pipe is automatically kept at substantially the pressure indicated by the gage 80, and this can be readily varied by the engineer by merely manipulating the three-way cock 79.

The engine brake cylinder is diagrammatically shown at 80ᵃ. 81 is the engine triple valve which may be of various types but which preferably is of the type illustrated, described and claimed in my application filed March 30, 1912, Serial No. 687,534. This triple valve, however, is not connected directly to the engineer's brake cylinders, as is usual, but is connected thereto through a special engine brake application and pressure maintenance valve 82, which is specifically illustrated, described and claimed in my application filed July 11, 1912, Serial No. 708,914. The engine auxiliary reservoir is indicated at 83 connected to the triple valve 81, as usual, but is of less capacity than usual, as instead of having to supply the engine brake cylinders it supplies a relatively small chamber in the application valve 82, as will hereinafter appear.

The application valve 82 comprises a suitable casing whose interior is divided by a suitable abutment, such as diaphragm 84, into two chambers 85 and 86. Chamber 86 has a connection 87 to brake cylinder 80ᵃ; a suitable safety or blow-off valve 88 being placed in said connection. It also has communication with a pipe 89 in which is a suitable reducing valve 90 and which leads to the train pipe connection 11ª of feed valve 10, so that pipe 89 is, in effect, a brake pipe carrying the same pressure (except as reduced by valve 90) as in the train pipe of the system. Between the connections 87 and 89 in chamber 86 is a suitable wall or partition 91 forming a seat for valve 92 and provided with two ports, one port 93 forming a communication between pipes 89 and 87 and the other port 94 leading to the atmosphere. Valve 92 is actuated by a projection 95 on stem 96 of diaphragm 84 and is provided with a cavity 97 arranged to establish communication at the proper time between ports 93 and 94. Chamber 85 on the opposite side of diaphragm 84 has a connection 98 from which a pipe 99 leads to the application port 99ª of triple valve 81, so that whenever the triple valve 81 moves to application position air from auxiliary reservoir 83 passes into chamber 85, and when said triple valve moves to release position pressure from chamber 85 is exhausted to the atmosphere, exactly the same as though the triple valve were connected directly to the brake cylinder instead of to chamber 85. A pipe 100 provided with a cut-out cock 101 leads to a pipe 102 which connects port 102ª in the seat of the engineer's brake valve with the exhaust port 102ᵇ of the triple valve 81. Cut-out cock 101 is closed when the engine is running second or subsequent in a double header, but is open when the engine is the leading one. Pipe 99 has another branch 103 leading to the gage 104 by viewing which the engineer can regulate the amount of pressure in chamber 85.

Figure 1A:
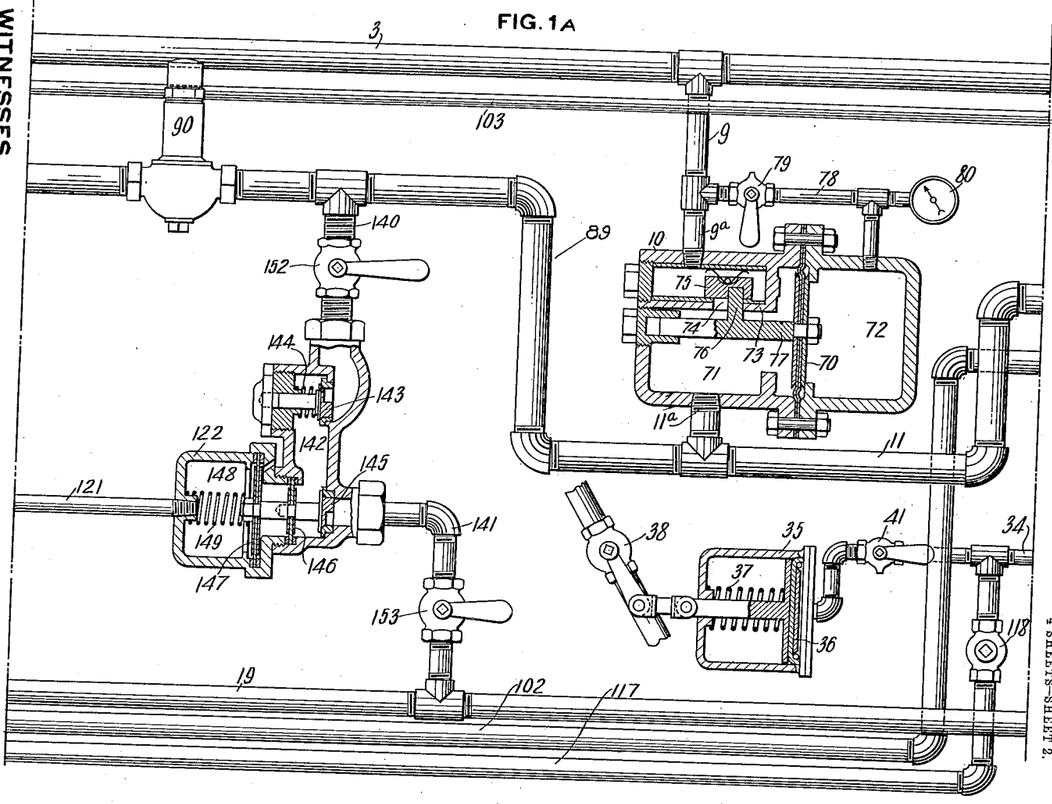
Figure 1B:
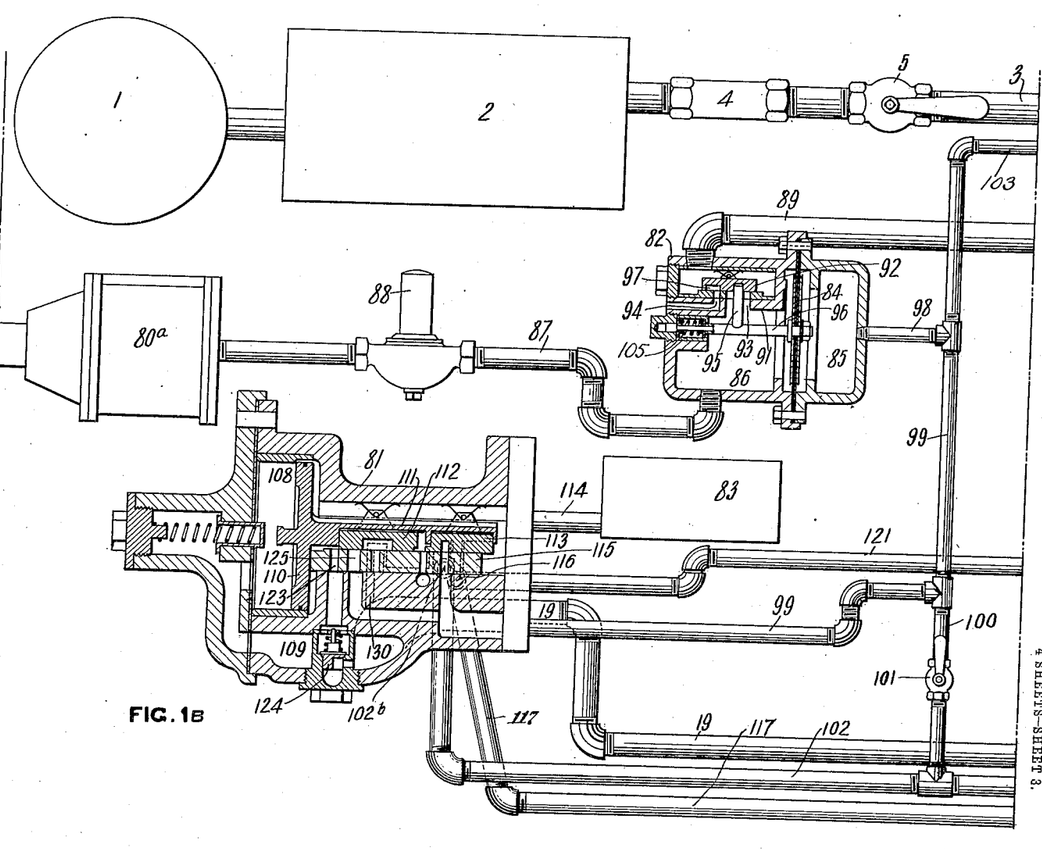

Fig. 1ᴮ shows the application valve 82 in lap or holding position in which communication between the main reservoir pipe 89 and brake cylinder pipe 87 is interrupted and exhaust port 94 is closed. In this position the pressures on opposite sides of the diaphragm 84 are balanced. We will assume that the engine is a leading engine and that cut-out cock 101 is open. If the engineer desired to apply the engine and tender brakes, he moves his valve to engine application position to establish communication between ports 3ª and 102ª, thereby admitting main reservoir pressure through pipe 102, branch 100 and pipes 99 and 98 to chamber 85 until the gage 104 shows the desired amount of pressure to be carried in the brake cylinder. This moves the diaphragm 84 and slide valve 92 to the left, uncovering port 93 and permitting main reservoir pressure from pipe 89 to pass through the valve to pipe 87 and to the brake cylinder. As soon as the pressure in the brake cylinder balances the pressure in chamber 85, the diaphragm 84 is moved back to neutral position by spring 105, cutting off further flow of air to the brake cylinder. Consequently, the engineer can apply the engine brakes with any desired degree of pressure by merely admitting to chamber 85 an amount of pressure equal to that desired in the brake cylinder, and as soon as this is reached, (irrespective of piston travel) the valve automatically laps the connection between the main reservoir and the brake cylinder. Should the brake cylinder leak and the pressure therein be materially reduced, the preponderating pressure in chamber 85 again moves the diaphragm and valve to the left to admit more air from the main reservoir to the brake cylinder until the pressure in the latter again balances the pressure in chamber 85, when the connection will again be lapped. Consequently, the valve not only applies the brakes but also maintains the brake cylinder pressure against leakage. When it is desired to graduate off or entirely release the brakes, the engineer exhausts the pressure from chamber 85 proportionately, permitting diaphragm 84 to move to the right under brake cylinder pressure in chamber 86 until the cavity 97 in the slide valve connects ports 93 and 94, thereby exhausting brake cylinder pressure to the atmosphere. As soon as the brake cylinder is exhausted to the degree of equalization of pressure on opposite sides of the diaphragm 84, the spring 105 moves the piston and valve back to normal or lap position. Whenever the engineer's brake valve is put in either service or emergency position the triple valve 81 automatically supplies air from the auxiliary reservoir 83 to the chamber 85, thus securing an actuation of valve 92 to admit air to the brake cylinder.

If the engine is second or subsequent in a multiple header, the cock 101 is closed. The triple valve 81 being connected to brake pipe 19 will be actuated the same as any triple valve on a car upon reduction of train pipe pressure, and the engineer's brake valve is set in running position so as to connect pipe 102 to the atmosphere. The brakes are applied by the leading engineer in the usual manner by reducing train pipe pressure and are released by increasing train pipe pressure. Reduction of train pipe pressure causes the triple valve 81 to move to application position, thereby permitting air from the auxiliary reservoir 83 to flow through pipe 99 and connection 98 to chamber 85, and the engine brakes will be applied in the same manner as when air was supplied to chamber 85 directly from the engineer's brake valve, and when train pipe pressure is increased the triple valve moves to release position, thereby exhausting pressure from chamber 85 through pipe 102 to the atmosphere at the engineer's brake valve. The auxiliary reservoir 83 need be only large enough to supply chamber 85 with a maximum amount of pressure desired in the brake cylinder, and since chamber 85 is relatively small, it necessitates only a relatively small auxiliary reservoir. Should the brake cylinders leak, pressure therein is replenished automatically in the same manner as hereinbefore described. This special valve, therefore, provides for the application of the brakes either directly from the engineer's brake valve or automatically from the triple valve, and also provides for maintaining the pressure in the brake cylinder against leakage.

The triple valve 81 is of the usual type of standard triple valves having therein a piston chamber 108 in communication through passage 109 with brake pipe 19. In the chamber 108 works the usual piston 110 having a stem 111 actuating a pair of slide valves, to-wit; a relatively large slide valve 112 having a slight lost motion connection with stem 111 and a smaller or graduating slide valve 113 having no lost motion connection with the piston stem. Piston 110 is open on one side to train pipe pressure and on its opposite side to pressure in auxiliary reservoir 83 through connection 114. The valve seat 115 with which the valves 112 and 113 coöperate is provided with the ports shown in Fig. 4, to-wit; a port $102^b$ communicating with pipe 102 leading to the engineer's brake valve and forming the exhaust port; a port $99^a$ communicating with pipe 99 leading to the engine brake application valve 82; a port 116 communicating with pipe 117 having connection with a steam cut-off valve pipe 34 which has a non-return check valve 118 which will permit air to flow from the triple valve to the steam cut-off valve but not in the reverse direction; a port 120 communicating with a pipe 121 leading to a double heading valve 122 hereinafter described; a port 123 having communication with train pipe passage 109 and controlled by a check valve 124 seating toward the train pipe; a large port 125 communicating with the application pipe 99; a port 127 communicating with the usual blow-off valve; a port 129 which may connect with a supplemental reservoir when such reservoir is used as described in my application Serial No. 687,534, filed March 30, 1912, or which may be plugged in case such reservoir is not used; a port 130 communicating with train pipe passage 109; and two small ports 131 and 132 connected by longitudinal passage 133.

The slide valve 112 is provided with a large, substantially square cavity 135 and a smaller longitudinal cavity 136. The smaller slide valve 113 is of substantially L-shape and provided with a transverse cavity 137 having near one end a longitudinal extension 138. This valve has seven different positions, as fully described in my application Serial No. 687,534, above referred to, to-wit: (1) full release and recharging position; (2) quick service position or serial venting position; (3) full service position; (4) service lap position; (5) graduated release position; (6) graduated release lap position; and (7) emergency position, but in the drawings of the present application, only three positions are shown, as follows:

*1. Full release position, shown in Fig. 5.—* In this position, cavity 137 in slide valve 113 connects ports $99^a$ and $102^b$, thus venting chamber 85 in the application valve 82 to the atmosphere and permitting the valve 82 to release the brake cylinder $80^a$ as above described. Extension 138 laps over the extension of port 120, thus exhausting the double heading control valve to the atmosphere. Valve 112 has uncovered train pipe port 123 so as to permit of a quick recharging of auxiliary reservoir 83. The supplemental reservoir port 129 is open so that in case a supplementary reservoir is used it will also be charged. All other ports are blanked.

*2. Service position, shown in Fig. 6.—* In this position the slide valves 112 and 113 have moved over sufficiently to uncover port $99^a$, permitting air to pass from the auxiliary reservoir 83 through pipe 99 to chamber 85 of the application valve 82, and securing an application of the engine brakes, as hereinbefore described. The double heading valve port 120 is also uncovered. Valve 112 has connected ports 125 and 127 so that all pressure admitted to chamber 85 in excess of that to which the blow-off valve has been set, will be released. All other ports are blanked.

Figure 7:
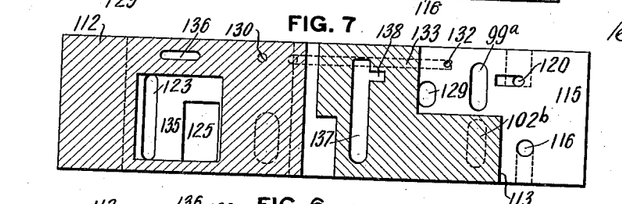

*3. Emergency position, shown in Fig. 7.—* In this position the small slide valve 113 has been moved over until it uncovers supplemental reservoir port 129 as well as port $99^a$ so that in case the supplementary reservoir is used chamber 85 in application valve 82 is supplied with air from both the auxiliary and supplemental reservoirs. Double heading valve port 120 is also open, as is also steam cut-off valve 116, the latter permitting air from the auxiliary and supplemental reservoirs to flow through pipe 117 to the steam cut-off valve actuating cylinder 35, check valve 42 preventing this pressure from escaping at the valve 17, should the latter from any cause move from its normal or lap position. Cavity 135 in valve 112 also connects train pipe port 123 with port 125 so that the air flowing to chamber 85 of application valve 82 is supplemented by air coming directly from the train pipe. As soon as the pressure in chamber 85 equalizes with the train pipe pressure check valve 124 closes.

This triple valve acts in the same manner as any triple valve, except that instead of admitting air to and exhausting it from a brake cylinder, it admits air to and exhausts it from the chamber 85 in the application valve 82. In addition to the usual functions of a triple valve, it also admits (in the system illustrated) air from the auxiliary and supplemental reservoirs to the steam cut-off valve when in emergency position, and also admits air to a double heading control valve in all positions except full relase position, the purpose of this double heading valve being to cut off the main reservoir from the train pipe on the second and subsequent engines of a multiple header (where the brake valve is in running position) to prevent the second or subsequent engine from pumping off the brakes which have been set by the first engine.

Figure 5:
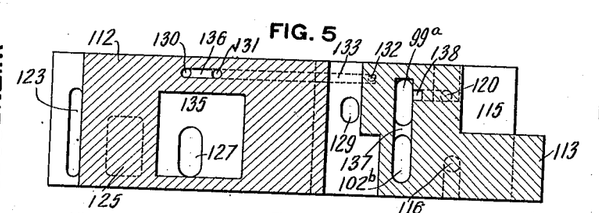

The double heading valve 122 is specifically illustrated, described and claimed in my application Serial No. 687,535, filed March 30, 1912. It comprises a suitable casing having a connection 140 with the pipe 11 which is supplied with pressure from the main reservoir through feed valve 10, and a connection 141 to the brake pipe 19. The connection 140 is substantially a main reservoir connection while the connection 141 is substantially a train pipe connection. The passage 142 between these connections is controlled by an equalizing check valve 143 normally held seated against main reservoir pressure by spring 144, and by means of a cut-off valve 145 seating toward the train pipe and actuated by a differential piston mechanism illustrated as a pair of diaphragms, to-wit; a small diaphragm 146 subject at all times to train pipe or main reservoir pressure and a large diaphragm 147 subject to pressure in a chamber 148 coming through pipe 121 from the auxiliary reservoir 83 when the triple valve 81 is in any position except full release position. A spring 149 supplements the pressure in chamber 148. In connection 140 is a cut-out cock 152 and in connection 141 is a similar cock 153, both of which are open when the engine is second or subsequent in a multiple header but are closed when the engine is leading. When the engine is leading, this valve does not operate and performs no function. When, however, the cut-out cocks are open and the engineer's valve is in running position (as is the case with a second or subsequent engine in a multiple header) and with the triple valve 81 in full release position, chamber 148 is exhausted to the atmosphere through the triple valve, as shown in Fig. 5, so that no pressure exists in said chamber. Consequently, main reservoir pressure acting against the smaller area of the differential piston mechanism pushes the same toward the left, viewing Fig. 1$^A$, and unseats valve 145 so that main reservoir pressure coming by way of feed valve 10 unseats check valve 143 and flows to the train pipe in the usual way, so that the pumps on all engines are available for supplying the system with air. As soon, however, as the triple valve moves to service or emergency position, which occurs when the leading engine brake valve is set to service or emergency application position, the triple valve admits pressure from the auxiliary reservoir 83 through pipe 121 to chamber 148, and this pressure supplemented by spring 149 acting on the large area of the differential piston mechanism overbalances main reservoir and train pipe pressure acting against the small area of said differential piston mechanism, seating valve 145 and cutting off the flow of air from the main reservoir to the train pipe on the second and subsequent engines of multiple headers and preventing the brakes from being pumped off by the pumps on these engines. As soon as the train pipe pressure is restored at the leading engine, the triple valve on the subsequent engine goes to release position and exhausts the pressure from chamber 148 as above described and permits main reservoir pressure in passage 142 acting against diaphragm 146 to unseat valve 145 and again establish communication between the main reservoir and the train pipe to supplement the main reservoir on the leading engine. Spring 144 is of sufficient strength to temporarily seat valve 143 during normal service application reductions in the train pipe, so as to permit the triple valve mechanism to operate in the usual manner and, therefore, prevent the main reservoir pressure from the assisting engine flowing into the train pipe and defeating the intended service or emergency application of the engineer of the leading engine.

The engineer's brake valve 6 is constructed as illustrated, described and claimed in my application Serial No. 707,737, filed July 5, 1912. The seat 160 of said valve is provided with the ports heretofore referred to, to-wit; direct main reservoir port 3$^a$; port 11$^a$ coming from the main reservoir by way of feed valve 10; train pipe port 16$^a$ equalizing reservoir port 13$^a$; port 33$^a$ communicating with pipe 33 leading to the port 33$^b$ of emergency cut-off valve 17; steam cut-off valve port 40$^a$; port 102$^a$ communicating with pipe 102 connected to the exhaust port 102$^b$ of triple valve 81, said port 102$^a$ being connected by passage 102$^c$ with another port 102$^d$; exhaust port 161 connected by passage 161$^a$ with a second exhaust port 161$^b$; a port 162 communicating with the pump governor; and a small warning port 163 which is open to the atmosphere in all positions of the valve in which the main reservoir is connected directly to the train pipe in order that the escaping air may warn the engineer not to leave the valve too long in that position and overcharge the train pipe.

Figure 3:
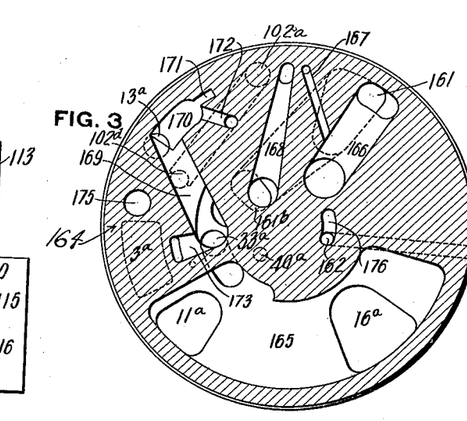
Fig. 3 is a horizontal section through the rotary disk of the engineer's valve with the seat in plan view and showing the valve in position to release the train brakes and hold the engine brakes.

Coöperating with the valve seat is the usual rotary disk 164 provided with the following ports, cavities and passages, to-wit; a large cavity 165 of general arc-shape extending about one-third the distance around the disk; a cavity 166 open only at the ends and extending substantially radially from near the center to near the periphery of the disk and having a branch 167 extending close to the periphery of the disk; a cavity 168 also open only at its ends and extending from near the periphery of the disk to near the center of the disk; a cavity 169 having near the periphery an open extension 170 with two branches 171 and 172 and at its other end having a radial extension 173; and two ports extending entirely through the disk, to-wit; a port 175 located near the periphery of the disk, and an oblong port 176 located substantially diametrically opposite port 175 but relatively near the center of the disk. This rotary disk is actuated in the usual way from handle 177.

The valve has ten positions as fully described and illustrated in my application Serial No. 707,737, above identified, to-wit: (1) running position, (2) engine and train release position, (3) service position, (4) maintenance lap position, (5) engine application position, (6) engine release position, (7) graduated release position, (8) train release and engine holding position, (9) engine and train full release position, and (10) emergency position. In the present application only one of these positions, to-wit, position number 8, train release and engine holding position, is illustrated in Fig. 3.

When the engine is an assisting engine the brake valve is set in engine and train release position, in which cavity 168 connects port 102ª to exhaust port 161ᵇ so that the exhaust port of triple valve 81 communicating with pipe 102 is open to the atmosphere through the engineer's brake valve. In addition, cavity 165 connects port 11ª coming from the main reservoir by way of the feed valve with port 33ª with which communicates pipe 33, thereby admitting main reservoir pressure at port 33ᵇ underneath slide valve 61 of the special emergency valve 17. Cavity 169 also connects port 33ª with equalizing reservoir port 13ª so that the equalizing reservoir is charged to the same pressure as the train pipe. Cavity 165 also connects the main reservoir port 11ª with train pipe port 16ª so that piston 55 is subject to equal pressures on both faces, on one face to equalizing reservoir pressure and on its opposite face to pressure admitted through port 16ª. Feed valve 10 is supplying the equalizing reservoir with the desired amount of pressure. Triple valve 81 is in full release position, application valve 82 is in neutral position and double heading valve 122 is open so that main reservoir pressure coming through the feed valve 10 is supplied to the train pipe. Cocks 28 and 101 are closed, but cocks 152 and 153 are open. When in this position the engineer of the leading engine controls the brakes on the assisting engines entirely automatically, by reducing the train pipe pressure to apply the brakes and increasing the train pipe pressure to release the brakes, the triple valve 81 acting under reductions and increases of train pipe pressure as usual to admit air to and exhaust air from chamber 85 of the application valve 82, as hereinbefore described. The triple valve exhausts through the engineer's brake valve. Whenever the brakes are applied the triple valve also admits pressure to chamber 148 of the double heading valve 122 to close communication from the main reservoir to the train pipe and prevent the assisting engine from pumping off the brakes. Should a hose burst or other rupture in the train line occur, the triple valve goes to emergency position, the same as it would on any car, admitting both auxiliary reservoir and train pipe air to chamber 85 of the application valve and applying the engine brakes with full force. In addition, port 116 is opened so as to admit air through pipe 117 to the cylinder 35 which actuates the steam cut-off valve 38 to cut off the steam from the cylinders of the assisting engine.

On the leading engine cocks 152 and 153 are closed so that double heading valve 122 is there inoperative. Cocks 28 and 101 are open so that the engineer has full control of the train pipe, and can also apply the engine brakes of the leading engine by admitting air to chamber 85, by merely bringing the valve to engine application position, in which position extension 173 laps over main reservoir port 11ª so as to admit pressure not only to the emergency cut-off valve port 33ª but also through cavities 169, 170 and 172 to port 102ᵈ, thence through pipes 102, 99 and 98 to chamber 85 of the application valve. When the engineer's valve is brought back to engine release position or to engine and train release position, pressure is exhausted from chamber 85 by cavity 168 in the rotary disk connecting port 102ª to exhaust port 161ᵇ. When the engineer's brake valve is in service position, cavities 167 and 166 connect equalizing reservoir port 13ª with exhaust port 161ᵇ, thereby causing triple valve 81 to act like any triple valve, the same going to service application position and admitting air from auxiliary reservoir 83 to chamber 85 of the application valve and applying the engine brakes. In emergency position of the engineer's brake valve the train pipe port 16ª is connected by cavity 165 to exhaust port 161, thereby securing an emergency movement of the triple valve 81 to cause an emergency application of the engine brakes by application valve 82. Consequently, the engineer is able to apply the brakes of the leading engine simultaneously with the brakes of the assisting engine and cars either in service or in emergency application, and can also release the same simultaneously or he can apply the brakes of the leading engine alone by going to engine application position, and can release the brakes of the engine alone by going to engine release position. In addition, he is able to secure a graduated release of all of the brakes of the entire train, including the leading engine, by moving his valve to graduated release position in which position cavity 173 laps over main reservoir port 11ª while extension 171 laps over equalizing reservoir port 13ª, thereby admitting a small amount of pressure to the equalizing reservoir, and by leaving the valve in this position until the equalizing reservoir gage shows an increase sufficient for the desired decrease in brake pressure and then moving it to lap position, the necessary release is effected automatically by the valve 17, the preponderance of equalizing reservoir pressure on piston 55 moving valve 61 until its cavity 67 connects ports 33ᵇ and 64, thereby effecting a communication between the main reservoir by way of ports 11ª, cavity 173, port 33ª, pipe 33, port 33ᵇ, cavity 67, port 64 and passage 66 to the train pipe side of piston 55, thereby securing an increase of pressure in the train pipe to exactly the same amount as the increased pressure in the equalizing reservoir, and causing the triple valves to move to release position and exhaust from the brake cylinders the amount of pressure corresponding to the increase of train pipe pressure. In emergency position, also, the cavity 168 connects the main reservoir port 3ª with the steam cutout valve port 40ª, thus automatically cutting off steam from the engine driver cylinders in emergency applications. Also, in running position, engine and train release position, and train release and engine holding position, the cavity 165 of the engineer's brake valve connects feed valve port 11ª with the train pipe port 16ª, so that in all positions of normal running and of releasing the brakes the feed valve 10 maintains train pipe pressure.

The system described provides for the independent control of the engine and train brakes; is particularly designed for double heading so as to give the leading engineer control of the brakes of the assisting engines as well as of the train; utilizes the pumps and main reservoirs of the assisting engines for supplying the system with air while preventing said assisting engines from pumping off the brakes when applied from the leading engine; is so arranged that upon bursting of the train line from any cause the brakes on the leading engine are automatically applied, the steam supply to its cylinders is automatically cut off, and the connection between the main reservoir and train pipe is closed, while on the assisting engines the brakes are also automatically applied and the steam cut off from their cylinders by the triple valve; provides for a graduated release of the brakes; restores the train pipe pressure due to leakage when the engineer's valve is in lap position; maintains a uniform pressure in locomotive brake cylinders regardless of the piston travel or leakage; and provides a simple and substantially automatically acting means for constantly maintaining the train pipe pressure uniform, as well as securing all usual functions of existing air brake systems.

What I claim is:

1. In an air brake system, the combination of a main reservoir, an engineer's valve, a brake cylinder, a triple valve, an auxiliary reservoir, and connections and valve mechanism comprising a movable abutment and a single valve actuated thereby and arranged to operate the brakes through the agency of air coming either from the main reservoir through the engineer's valve or from the auxiliary reservoir through the triple valve.

2. In an air brake system, the combination of a reservoir, a brake cylinder, and a valve mechanism connecting said brake cylinder and reservoir and comprising a movable abutment and a single valve actuated thereby and arranged upon admission of pressure to the movable abutment to open communication from the reservoir to the brake cylinder and upon exhaustion of pressure from the movable abutment to open communication from the brake cylinder to the atmosphere.

3. In an air brake system, the combination of a main reservoir, an engineer's valve, a brake cylinder, a triple valve, an auxiliary reservoir, and a valve mechanism comprising a movable abutment and a single valve actuated thereby, said valve being arranged upon admission of pressure to the movable abutment to open communication from the main reservoir to the brake cylinder and upon exhaustion of pressure from the movable abutment to open communication from the brake cylinder to the atmosphere, and said connections being arranged to supply pressure to and exhaust pressure from said movable abutment either through the engineer's valve or through the triple valve.

4. In an air brake system, the combination of a reservoir, a brake cylinder, valve mechanism connecting said reservoir and brake cylinder and comprising a movable abutment open on one side to brake cylinder pressure, and a single valve actuated by said movable abutment and controlling communication between the reservoir and the brake cylinder and between the brake cylinder and the atmosphere, and connections for admitting pressure to and exhausting the same from the other side of said movable abutment, said valve being arranged upon admission of pressure to the movable abutment to open communication from the reservoir to the brake cylinder and upon exhaustion of pressure from said movable abutment to open communication from the brake cylinder to the atmosphere.

5. In an air brake system, the combination of a reservoir, a brake cylinder, and valve mechanism connecting said reservoir and brake cylinder and comprising a movable abutment and a single valve actuated thereby and arranged to supply and maintain a definite pressure in the brake cylinder irrespective of piston travel or leakage and to release the same therefrom.

6. In an air brake system, the combination of a reservoir, a brake cylinder, valve mechanism connecting said reservoir and cylinder and comprising a movable abutment open on one side to brake cylinder pressure and having connections for admitting pressure to and releasing it from its opposite side, and a single valve actuated by said movable abutment and controlling the connection between the reservoir and the brake cylinder and arranged upon equalization of pressure on opposite sides of said movable abutment to close communication between the reservoir and the brake cylinder, upon preponderance of pressure on the brake cylinder side of said movable abutment to open communication from the brake cylinder to the atmosphere, and upon deficiency of pressure on the brake cylinder side of said piston to open communication from the reservoir to the brake cylinder.

7. In an air brake system, the combination of a reservoir, a brake cylinder, an engineer's valve, a triple valve, an auxiliary reservoir, connections from the auxiliary reservoir to the triple valve, and valve mechanism connecting said reservoir and said brake cylinder and having connections to the engineer's valve and the triple valve and comprising a movable abutment and a single valve actuated thereby and arranged upon admission of pressure thereto to open communication from the reservoir to the brake cylinder and upon exhaustion of pressure therefrom to open communication from the brake cylinder to the atmosphere.

8. In an air brake system, the combination of a reservoir, a brake cylinder, an engineer's valve, a triple valve, an auxiliary reservoir, and valve mechanism connecting said reservoir and brake cylinder and comprising a movable abutment having connections thereto for receiving pressure either from the reservoir by way of the engineer's valve or from the auxiliary reservoir by way of the triple valve, and a single valve actuated by said movable abutment and arranged upon admission of pressure to said movable abutment to open communication from the reservoir to the brake cylinder and upon exhaustion of pressure from said movable abutment to open communication from the brake cylinder to the atmosphere.

9. In an air brake system, the combination of a source of pressure, a train pipe, an engineer's valve between the source of pressure and the train pipe and arranged whereby all the air from the source of pressure to the train pipe must flow through the engineer's valve, a reservoir, a valve casing interposed between the engineer's valve and train pipe and forming the sole supply connection therebetween, a constantly open connection between said valve casing and said reservoir, a movable abutment in said casing open on one side to train pipe pressure and on its opposite side to reservoir pressure, a valve actuated by said movable abutment, and ports and passages controlled by said valve and arranged on reduction of pressure on the train pipe side of said movable abutment to connect the said source of pressure through the engineer's valve with the train pipe.

10. In an air brake system, the combination of a main reservoir, a pressure chamber, a train pipe, a valve casing having connection to the main reservoir, the pressure chamber and the train pipe, a movable abutment in said casing subject on one side to train pipe pressure and on the opposite side to chamber pressure, a valve actuated by said movable abutment and arranged upon a moderate preponderance of chamber pressure over the train pipe pressure to open communication from the main reservoir to the train pipe, and a second valve actuated by said movable abutment and arranged upon a large preponderance of chamber pressure over train pipe pressure to cut off communication between the main reservoir and the train pipe.

11. In an air brake system, the combination of a main reservoir, an engineer's valve, a triple valve, an auxiliary reservoir and a brake cylinder, said triple valve having the usual connections to the engineer's valve and auxiliary reservoir, connections from the triple valve service port to a movable abutment controlling connection between the main reservoir and the brake cylinder and between the brake cylinder and the atmosphere, a steam cut-off valve, and connections from a port controlled by the triple valve and open in emergency position to the steam cut-off valve.

12. In an air brake system, the combination of a main reservoir, an engineer's valve, a triple valve, an auxiliary reservoir and a brake cylinder, said triple valve having the usual connections to the engineer's valve and auxiliary reservoir, connections from the triple valve service port to a movable abutment controlling connection between the main reservoir and the brake cylinder and between the brake cylinder and the atmosphere, a valve controlling direct communication between the main reservoir and train pipe, and a port in said triple valve arranged in application positions to admit pressure to said last named valve to close communication from the main reservoir to the train pipe and in release position of the triple valve to exhaust pressure from said valve to open communication from the main reservoir to the train pipe.

13. In an air brake system, the combination of a main reservoir, an equalizing reservoir, a train pipe, an engineer's valve, and connections therebetween, an emergency valve in the train pipe connection from the engineer's valve and having connection to the equalizing reservoir and including a movable abutment balanced between the train pipe and equalizing reservoir pressures, and a valve actuated by said movable abutment and arranged upon slight reduction of train pipe pressure to open communication from the main reservoir to the train pipe when the engineer's valve is lapped and upon sudden reduction of train pipe pressure to close communication between the engineer's valve and train pipe.

14. In an air brake system, the combination of a main reservoir, an equalizing reservoir, a train pipe, an engineer's valve, and connections therebetween, an emergency valve in the train pipe connection from the engineer's valve and having connection to the equalizing reservoir and including a movable abutment balanced between train pipe and equalizing reservoir pressures, a valve actuated by said movable abutment and arranged upon slight reduction of train pipe pressure to open communication from the main reservoir to the train pipe when the engineer's valve is lapped and upon sudden reduction of train pipe pressure to close the connection between the engineer's valve and the train pipe and open communication from a reservoir to a steam cut-off valve.

15. In an air brake system, the combination of a main reservoir, an equalizing reservoir, a train pipe, an engineer's valve, and connections therebetween, a brake cylinder, an emergency valve in the train pipe connection from the engineer's valve and having a connection to the equalizing reservoir and including a movable abutment balanced between train pipe and equalizing reservoir pressures, a valve actuated by said movable abutment and arranged upon slight reduction of train pipe pressure to open communication from the main reservoir to the train pipe when the engineer's valve is lapped and upon sudden reduction of train pipe pressure to close communication between the engineer's valve and train pipe, and upon slight increase of equalizing reservoir pressure over train pipe pressure to open communication between the main reservoir and train pipe.

16. In an air brake system, the combination of a main reservoir, an equalizing reservoir, a train pipe, an engineer's valve, and connections therebetween, a brake cylinder, an emergency valve in the train pipe connection in the engineer's valve and having a connection to the equalizing reservoir and including a movable abutment balanced between train pipe and equalizing reservoir pressures, a valve actuated by said movable abutment and arranged upon slight reduction of train pipe pressure to open communication from the main reservoir to the train pipe when the engineer's valve is lapped and upon sudden reduction of train pipe pressure to close communication between the engineer's valve and train pipe, a valve arranged upon admission of pressure thereto to open communication from a reservoir to the brake cylinder, and a triple valve having its service port connected to said last named valve, whereupon on reduction of train pipe pressure said last named valve is actuated to open communication from a reservoir to the brake cylinder.

17. In an air brake system, the combination of a main reservoir, engineer's valve, train pipe, triple valve, auxiliary reservoir and connections therebetween, a brake cylinder, an application valve therefor connecting the same with the main reservoir, connections from said application valve to the service port of the triple valve and to the engineer's valve, a cut-out cock in the last named connection between the engineer's valve and the point of connection to the triple valve service port, a valve controlling direct communication between the reservoir and train pipe and connected to the triple valve, cut-out cocks on each side of said last named valve, and a cut-out cock in the train pipe between the engineer's valve and triple valve.

18. In an air brake system, the combination of a main reservoir, an engineer's valve, a train pipe, an equalizing reservoir, and a pressure maintenance valve connected between the engineer's valve and the train pipe and having connection to the equalizing reservoir and including a movable abutment subject on one side to train pipe pressure and on its other side to equalizing reservoir pressure, and a valve operatively connected to the movable abutment and arranged upon reduction of train pipe pressure below equalizing reservoir pressure when the engineer's valve is in lap position to open communication from the main reservoir by way of the engineer's valve to the train pipe and restore the pressure in the latter.

19. In an air brake system, the combination of a main reservoir, an engineer's valve, a train pipe, an equalizing reservoir, and a pressure maintenance valve connected between the engineer's valve and the train pipe and having connection to the equalizing reservoir and including a movable abutment subject on one side to train pipe pressure and on its other side to equalizing reservoir pressure, and a valve operatively connected to the movable abutment and arranged on an increase of equalizing reservoir pressure over train pipe pressure to open communication from the main reservoir by way of the engineer's valve to the train pipe and upon substantial equalization of train pipe and equalizing reservoir pressures to close said communication.

20. In an air brake system, the combination of a main reservoir, an engineer's valve, a train pipe, an equalizing reservoir, and a pressure maintenance valve connected between the engineer's valve and the train pipe and having connection to the equalizing reservoir and including a movable abutment subject on one side to train pipe pressure and on its other side to equalizing reservoir pressure, a valve operatively connected to the movable abutment and arranged upon reduction of train pipe pressure below equalizing reservoir pressure when the engineer's valve is in lap position to open communication from the main reservoir by way of the engineer's valve to the train pipe and restore the pressure in the latter, and a spring arranged upon substantial equalization of train pipe and equalizing reservoir pressures to move the valve to close communication between the main reservoir and the train pipe.

21. In an air brake system, the combination of a main reservoir, an engineer's valve, a train pipe, an equalizing reservoir, and a pressure maintenance valve connected between the engineer's valve and the train pipe and having connection to the equalizing reservoir and including a movable abutment subject on one side to train pipe pressure and on its other side to equalizing reservoir pressure, and a valve operatively connected to the movable abutment and arranged on an increase of equalizing reservoir pressure over train pipe pressure to open communication from the main reservoir by way of the engineer's valve to the train pipe and upon substantial equalization of train pipe and equalizing reservoir pressures to close said communication, said engineer's valve including means for varying the pressure in the equalizing reservoir and thereby secure the desired pressure in the train pipe.

22. In an air brake system, the combination of a main reservoir, an equalizing reservoir, a train pipe, an engineer's valve, and connections therebetween, a valve in the train pipe connection from the engineer's valve and having connection to the equalizing reservoir and including a movable abutment balanced between the train pipe and equalizing reservoir pressures, a feed pipe connecting ports in the engineer's valve seat and in said valve, a valve actuated by said movable abutment and arranged upon increase of equalizing reservoir pressure to connect said feed pipe port with the train pipe, and said engineer's valve being arranged in one position to connect the main reservoir with the equalizing reservoir and with said feed pipe port.

23. In an air brake system, the combination of a main reservoir, an equalizing reservoir, a train pipe, an engineer's valve, and connections therebetween, a feed valve in the train pipe connection from the engineer's valve and having connection to the equalizing reservoir and including a movable abutment balanced between the train pipe and equalizing reservoir pressures, a feed pipe connecting a port in the engineer's valve seat and a port in said feed valve, and a valve actuated by said movable abutment and arranged upon diminution of train pipe pressure to connect the feed pipe port in said valve with the train pipe, and said brake valve being arranged in lap position to connect a main reservoir port with said feed pipe port.

24. In an air brake system, the combination of a main reservoir, a train pipe, an engineer's valve, a triple valve, and connections therebetween, a brake cylinder, a connection whereby the brake cylinder can be supplied with and relieved of pressure by movement of the engineer's valve, and connections whereby upon movement of the triple valve pressure is admitted to and exhausted from the brake cylinder, said engineer's valve being arranged in one position to effect connection from the main reservoir to the brake cylinder and in another position to effect connection from the brake cylinder to the atmosphere and in both positions blanking the connections to the train pipe and triple valve.

25. In an air brake system, the combination of a main reservoir, an equalizing reservoir, a train pipe, an engineer's valve, a triple valve, and connections therebetween, a brake cylinder, connections whereby the brake cylinder can be supplied with and relieved of pressure by movement of the engineer's valve, and connections whereby upon movement of the triple valve pressure is admitted to and exhausted from the brake cylinder, said engineer's valve being arranged in one position to effect connection from the main reservoir to the brake cylinder, in another position to effect connection from the brake cylinder to the atmosphere and in both positions blanking the connections to the train pipe, in a third position to connect the train pipe to the atmosphere and thereby actuate the triple valve to apply the brakes, and in a fourth position to connect the main reservoir to the train pipe and effect connection from the brake cylinder to the atmosphere.

26. In an air brake system, the combination of a main reservoir, an equalizing reservoir, a train pipe, an engineer's valve, a triple valve, and connections therebetween, a brake cylinder, connections whereby the brake cylinder can be supplied with and relieved of pressure by movement of the engineer's valve, and connections whereby upon movement of the triple valve pressure is admitted to and exhausted from the brake cylinder, said engineer's valve being arranged in one position to effect connection from the main reservoir to the brake cylinder and in another position to effect connection from the brake cylinder to the atmosphere and in both positions blanking the connections to the train pipe, in a third position to connect the train pipe to the atmosphere and thereby actuate the triple valve to apply the brakes, in a fourth position to connect the main reservoir to the train pipe and effect connection from the brake cylinder to the atmosphere, and in a fifth position to connect the main reservoir to the train pipe while blanking the brake cylinder control port and triple valve exhaust port.

27. In an air brake system, the combination of a brake cylinder, a train pipe, a triple valve, an auxiliary reservoir, and the usual connections from the triple valve to the train pipe and to the auxiliary reservoir, and a valve mechanism comprising a movable abutment connected on one side to the application port of the triple valve and on its other side to the brake cylinder, and a single valve actuated from said movable abutment and controlling communication from the brake cylinder and the main reservoir and between the brake cylinder and the atmosphere.

28. In an air brake system, the combination of a brake cylinder, an engineer's valve, a train pipe, a triple valve, an auxiliary reservoir, and the usual connections from the triple valve to the train pipe and to the auxiliary reservoir, connections from the exhaust port of the triple valve to the engineer's brake valve, and a valve mechanism comprising a movable abutment connected on one side to the application port of the triple valve and on its other side to the brake cylinder, and a single valve actuated from said movable abutment and controlling communication from the brake cylinder and the main reservoir and between the brake cylinder and the atmosphere.

29. In an air brake system, the combination of a main reservoir, a train pipe, an engineer's valve connected between the main reservoir and train pipe, and a feed valve between the main reservoir and the engineer's valve and comprising a casing, a movable abutment in said casing subject on one side to train pipe pressure coming by way of the engineer's valve when the latter is in running position and on its opposite side to a predetermined fixed pressure, and a valve actuated by said movable abutment and controlling communication between the main reservoir and train pipe, whereby the feed valve maintains train pipe pressure when the engineer's valve is in running position.

30. In an air brake system, the combination of a main reservoir, a train pipe, an engineer's valve connected between the main reservoir and train pipe, and a feed valve between the main reservoir and the engineer's valve and comprising a casing, a movable abutment in said casing subject on one side to train pipe pressure coming by way of the engineer's valve when the latter is in running and train brake release positions and on its opposite side to pressure in a closed chamber, and a valve actuated by said movable abutment and controlling communication between the main reservoir and the train pipe.

31. In an air brake system, the combination of a main reservoir, a train pipe, an engineer's valve connected between the main reservoir and train pipe, and a feed valve between the main reservoir and the engineer's valve and comprising a casing, a movable abutment in said casing subject on one side to train pipe pressure coming by way of the engineer's valve when the latter is in running and train brake release positions and on its opposite side to pressure in a closed chamber, means for admitting a predetermined amount of pressure to said chamber, and a valve actuated by said movable abutment and controlling communication between the main reservoir and train pipe.

32. In an air brake system, the combination of a main reservoir, a train pipe, an engineer's valve connected between the main reservoir and train pipe, and a feed valve between the main reservoir and the engineer's valve and comprising a casing, a movable abutment in said casing subject on one side to train pipe pressure coming by way of the engineer's valve when the latter is in running and train brake release positions and on its opposite side to pressure in a closed chamber, manually operated means independent of the engineer's valve for controlling the pressure in said chamber, and a valve actuated by said movable abutment and controlling communication between the main reservoir and the train pipe.

33. In an air brake system, the combination of a main reservoir, a train pipe, an engineer's valve connected between the main reservoir and train pipe, and a feed valve between the main reservoir and the engineer's valve and comprising a casing, a movable abutment in said casing subject on one side to train pipe pressure coming by way of the engineer's valve when the latter is in running position and on its opposite side to pressure in a closed chamber, manually operated means arranged to admit pressure to and exhaust pressure from said chamber, and a valve actuated by said movable abutment and controlling communication between the main reservoir and the train pipe.

In testimony whereof, I have hereunto set my hand.

JACOB RUSH SNYDER.

Witnesses:
J. L. TREFALLER, Jr.,
WM. P. LARKIN.

Copies of this patent may be obtained for five cents each, by addressing the "Commissioner of Patents, Washington, D. C."